United States Patent
Bartos

[11] Patent Number: 5,583,480
[45] Date of Patent: Dec. 10, 1996

[54] AUTO ANTI-THEFT ALARM INDICATOR LIGHT

[76] Inventor: Joseph Bartos, 322 W. 57th St., Ste. 495, New York, N.Y. 10019

[21] Appl. No.: 426,710

[22] Filed: Apr. 24, 1995

[51] Int. Cl.⁶ .......................... B60R 25/10; G08B 23/00
[52] U.S. Cl. .................. 340/426; 340/425.5; 340/321; 340/331; 340/691; 340/693; 362/83.3; 307/10.8; 307/10.2
[58] Field of Search .................. 340/426, 425.5, 340/321, 331, 332, 457, 815.4, 815.45, 691, 693; 362/83.3, 800; 307/9.1, 10.1, 10.2, 10.8

[56] References Cited

U.S. PATENT DOCUMENTS

| | | | |
|---|---|---|---|
| 4,232,879 | 4/1982 | Kelley | 340/321 |
| 4,972,172 | 11/1990 | McLaughlin | 340/331 |
| 5,038,133 | 8/1991 | Martin | 340/426 |

OTHER PUBLICATIONS

J. C. Whitney Catalogue, p. 561k, Jan.–1994 "Simulated Alarm".

*Primary Examiner*—Donnie L. Crosland
*Attorney, Agent, or Firm*—Myron Amer PC

[57] ABSTRACT

A visual display unit simulating a known OEM (original equipment manufacture) auto anti-theft alarm embodying a rotating on-off switch for a flashing LED which is not applicable for OEM use, but usable for the simulated unit since the locked auto in which the unit is observed prevents inspection that would reveal its true nature.

1 Claim, 1 Drawing Sheet

AUTO ANTI-THEFT ALARM INDICATOR LIGHT

The present invention relates to anti-theft protection for an auto, and more particularly to an effective simulation of an original equipment manufacture (OEM) alarm as typically provided by an auto manufacturer or its authorized dealership.

DESCRIPTION OF THE PRIOR ART

As a simulation of an auto OEM anti-theft alarm it is already known in the prior art to provide a device with a flashing LED to give the impression to an observer that an operating alarm is monitoring the auto, and thus to dissuade theft or vandalism of the auto. Exemplary of this prior art is a "Simulated Alarm" advertised in J. C. Whitney's catalogue, at 561K, with the copyright year 1993, published in early 1994.

In contrast to the advertised and all other known OEM-simulating auto anti-theft alarms, and underlying the within patentable advance, is the recognition that part of the necessary simulated visual appearance that has to be displayed to deter a potential theft is a LED located centrally of a hub-like housing of a circular configuration.

The housing part of the within simulated display is thus used to advantage to turn on and off the LED with a simple rotatable traverse which is a degree of movement that is readily achieved by the use of a stationary center mounting the LED embodying one electrical contact, and the hub-like housing rotatable about the LED embodying the other electrical contact. The prior art uses the same on-off control for the simulated device as used for the OEM device, and consequently the control is more expensive than it needs to be, since the same locked condition of the auto which prevents the observer from detecting the absence of a functioning alarm also prevents detection of the greatly simplified on-off control not applicable for an OEM alarm, but totally satisfactory for a simulated version thereof.

SUMMARY OF THE INVENTION

Broadly, it is an object of the present invention to provide an OEM substitute for an auto anti-theft alarm overcoming the foregoing and other shortcomings of the prior art.

More particularly, it is an object to simulate in the substituted alarm the visual display which contributes to minimizing theft and vandalism, and also an effective on-off control which, while not appropriate for an OEM alarm, is efficient in its operating mode for the purposes intended, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

DESCRIPTION OF THE PREFERRED EMBODIMENT

Figure 1:
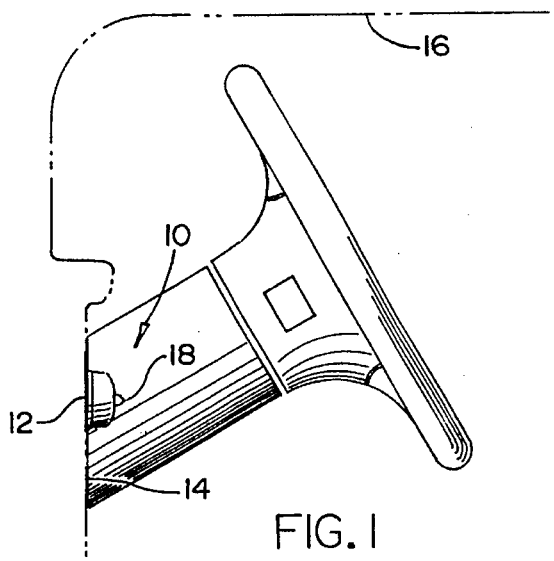
FIG. 1 is a partial side elevational view of the driver's side of an auto illustrating a preferred location of the within inventive theft deterrent light-signaling device.
Figure 3:
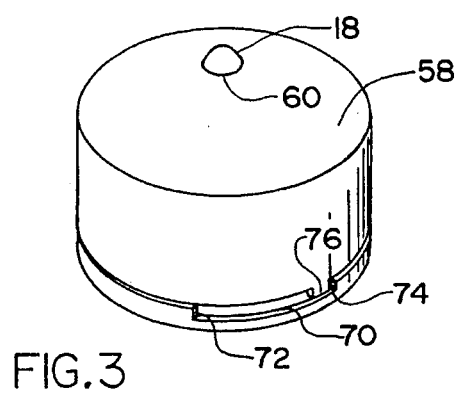
FIG. 3 is a perspective view of the light-signalling device.

As is well known, an auto anti-theft alarm actually in operating service for an auto is expensive and it is desirable, therefore, to avoid this expense and yet obtain the benefit of deterring a theft or vandalism of the auto which it provides. As a substitute for an original equipment manufacture (OEM) anti-theft alarm as normally provided by the auto manufacturer or an authorized dealer, there is available in the so-called aftermarket a less expensive light-signalling device, herein designated 10, which can be used for display, at location 12 on the dashboard 14 of a locked auto 16 normally accorded an actual functioning anti-theft alarm light-signally device which, seen by an outside observer through the auto window, has in practice been known to deter auto theft and vandalism, since device 10 provides a LED 18 in a flashing operating mode which the observer cannot distinguish from an OEM anti-theft alarm light-signalling device and, of course, the assumed locked condition of the auto 16 prevents the observer from supplementing what is seen by actual inspection of the device 10 as might disclose its non-operational condition.

As a patentable advance to already known simulated light-signalling devices, the within device 10 has a greatly facilitated operating mode for causing, when needed, and terminating, when not needed, the flashing operating mode of the LED 18. More particularly, and as best understood from FIG. 2, device 10 has a two unit housing for the LED 18, one unit of which is comprised as a base component 20 constructed as a partial cylinder with an upstanding side wall 22 and closed at a bottom end by a circular base per se, designated 24, having an exposed bottom surface 26 and a top surface 28. Permanently affixed, in any appropriate manner to the bottom exposed surface 26, is an adhesive pad 30 having a circular disc 32 of release paper construction material that is adapted to be peeled from the pad 30 preparatory to the adhesive attachment of the device 10 at the dashboard location 12 or other appropriate location as selected by the user.

Figure 4:
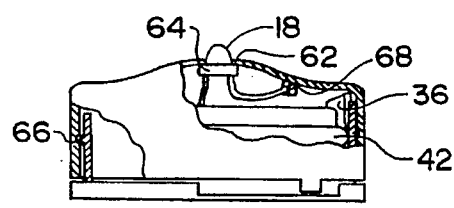
FIG. 4 is a side elevational view of the light-signalling device partially in section to illustrate the relative positions of contacts of an electrical circuit in a position of rotation of a rotatable housing component of the device.
Figure 5:
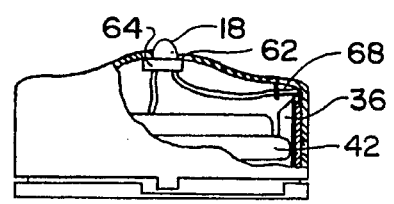
FIG. 5 is similarly a side elevational view partially in section of said device to again illustrate relative positions of said electrical circuit contacts, but at another position of rotation of said housing component.
Figure 6:
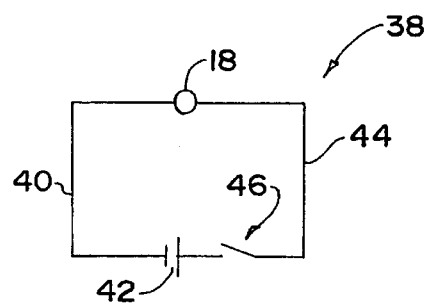
FIG. 6 is a simplified circuit diagram.

On the interior side wall 22 is a slot 34 sized to have seated therein a brass or other electrically conductive first contact 36 of a battery-operated circuit 38, as represented by the simplified circuit diagram of FIG. 6, wherein first contact 36 is electrically connected to an electrical lead 40 between the LED 18 and a 3 volt battery 42, as also shown in FIGS. 4, 5. To complete the circuit 38, there is provided an electrical lead 44 electrically connected between the LED 18 and the battery 42 and, most important, having an on-off switch 46, which switch, according to the present invention, is functionally served by the other housing component or unit, herein designated 48.

Figure 2:
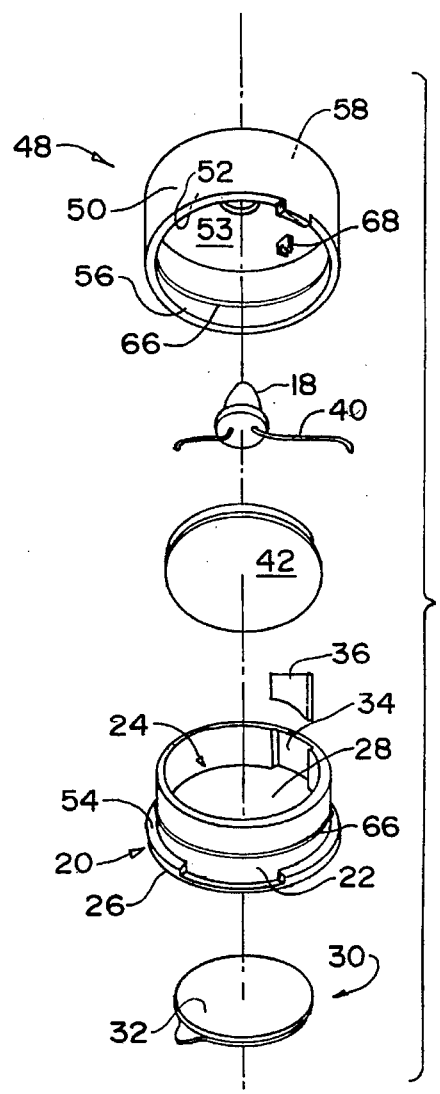
FIG. 2 is an isolated exploded view of the light-signalling device illustrating the major components thereof and the preferred assembly thereof.

Still referring primarily to FIG. 2, unit 48 is comprised as a closure for the unit or base component 20 and consists of a nominally slightly oversized, in relation to the diameter of base component 20, cylindrical housing having a side wall 50, the inner surface 52 of which bounds a storage compartment 53 for the LED resulting from housing 48 being disposed over the base component inner wall 22 and seating on a peripheral edge 54 of the base housing component 20, the provision for this assembly of the units 20 and 48 being the bottom opening 56 of unit 48 allowing the projection of the inner wall 22 of the base unit 20 within the confines of the housing cylindrical wall 50.

Housing unit 48 also has a top 58 serving as a closure for the compartment 53, except for a central opening 60 for displaying the LED 18 which is positioned to extend from beneath the top 58 to project through the opening 60 and held in this display position by adhesive attachment, as at 62, of an LED base 64 to the underside of the top closure 58, as shown in FIGS. 4 and 5. As best shown in FIG. 4, in the running clearance between the rotatable outer housing 42 and the inner stationary housing 24 is a tracking means in the form of a cooperating lateral projection and circular detent or recess 66 which assists in the tracking of housing 42 about housing 24 and, while preferred, other bearing or like means can also be used which, in a well understood manner allows a rotational degree of movement of said cylindrical housing 48 relative to the stationary adhesively affixed housing base 20 incident to providing a path of movement for a second circuit contact 68 to said first circuit contact 36. Thus, as best understood from FIG. 4, the second circuit contact 68 has a starting position of rotation at which it is out-of-contact with the circuit first contact 36 and, as a consequence, the circuit 38 is open and the battery 42 does not power the LED in its flashing operational mode. A pivotal or rotational traverse of the housing 48 from the FIG. 4 position of rotation in a clockwise direction, establishes rubbing engagement or contact of the circuit second contact 68 with the circuit first contact 36, and in a well understood manner electrically connects the battery 42 to the LED 18, i.e. closes or completes the circuit 38, and causes the LED 18 to operate in its flashing mode, which mode will be perceived by an observer to indicate that the auto 16 is protected by an anti-theft alarm.

For proper imposing of limits to the tracking of housing 48 along the path of movement in clockwise and counterclockwise rotational traverses to respectively close and open the circuit 38 and correspondingly cause, when needed, a flashing operational mode in the LED 18, and terminate, when not needed, this operational mode of the LED 18, a slot 70 is provided in the peripheral edge 54 having a lengthwise dimension related to the circumferencial spacing between the FIG. 4 starting position of rotation of said second circuit contact 68, shown in phantom perspective on the inner surface of the side wall 50 of the housing 48, and the FIG. 5 subsequent position of rotation thereof. The opposite end walls 72 and 74 of the slot 70 serve as stops for a depending projection 76 on the housing bottom edge 78 to limit the directional rotational traverses of the housing 48.

While the apparatus for practicing the within inventive method, as well as said method herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. For use in a locked auto, a visual light-signalling device of a type used for display to an outside observer to indicate an anti-theft alarm not actually in operating service for said auto to deter theft of said auto by said observer, said light-signalling device comprising a nominally sized circular base serving as a housing component for said light-signalling device having an exposed bottom surface and an enclosed top surface, an adhesive applied to said base exposed bottom surface for adhesive attachment to a selected display location within said auto normally used for an actually operating auto anti-theft alarm, an assembly of a battery-operated circuit having a first circuit contact and an LED having a flashing operating mode electrically connected to said circuit, a cylindrical housing having an inner wall bounding a compartment for said LED having an open bottom sized to receive in projected relation therein said circular housing base and having a closed top with a central opening for display of said LED adapted to have an operative position within said top central opening, said cylindrical housing having an operative position disposed in covering relation over said LED with said housing base within said bottom opening thereof and said LED in a display location projected through said top central opening thereof, a tracking means disposed in an interposed position between said cylindrical housing and said housing base so as to allow a rotational degree of movement of said cylindrical housing relative to said housing base incident to providing a path of movement to said first contact of said battery-operated circuit, and a second contact of said battery-operated circuit mounted on said cylindrical housing in said compartment thereof so as to be urged in movement along said path of movement into contact with said first contact of said battery-operated circuit, said second contact being electrically connected to close said battery-operating circuit upon contact with said first contact and to open said circuit when not in contact therewith, whereby said cylindrical housing incident to clockwise and counterclockwise rotational traverses serves as an on-off switch for causing and terminating the flashing operating mode of said LED.

* * * * *